D. T. DUCKWORTH.
NUT LOCK.
APPLICATION FILED AUG. 4, 1919.

1,334,893.

Patented Mar. 23, 1920.

WITNESS:
R. G. Thomas

INVENTOR.
BY D. T. Duckworth
Victor J. Evans
ATTORNEY.

UNITED STATES PATENT OFFICE.

DEWITT T. DUCKWORTH, OF SAPULPA, OKLAHOMA.

NUT-LOCK.

1,334,893.   Specification of Letters Patent.   Patented Mar. 23, 1920.

Application filed August 4, 1919. Serial No. 315,294.

*To all whom it may concern:*

Be it known that I, DEWITT T. DUCKWORTH, a citizen of the United States, residing at Sapulpa, in the county of Creek and State of Oklahoma, have invented new and useful Improvements in Nut-Locks, of which the following is a specification.

This invention has reference to a means for locking a nut on a bolt.

The object of the invention is to produce a nut lock of a comparatively simple construction which will be thoroughly efficient in action, but which also permits the removal of a nut from a bolt should the same be found desirable.

The foregoing objects, and others which will appear as the nature of the invention is better understood may be accomplished by a simple construction and operative arrangement of parts such as is illustrated by the drawings.

Figure 1:
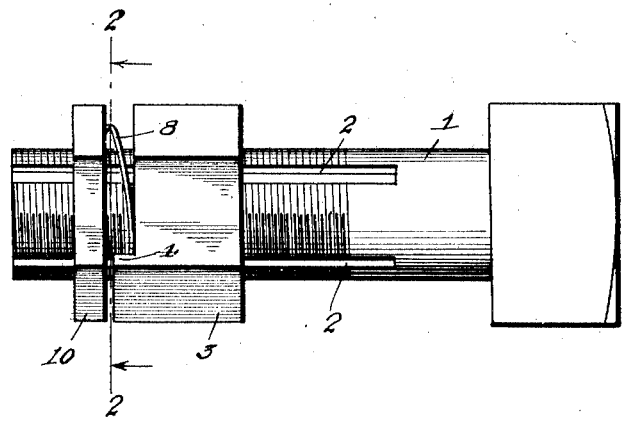
Figure 1 is a side elevation illustrating a nut locked upon a bolt in accordance with this invention.
Figure 2:
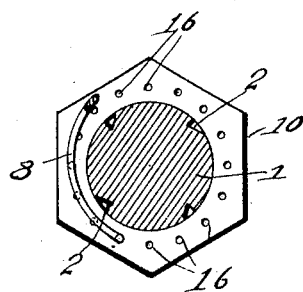
Fig. 2 is a sectional view approximately on the line 2—2 of Fig. 1 looking in the direction of the arrows.
Figure 3:
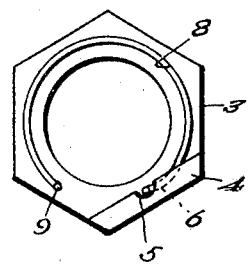
Fig. 3 is a face view of the nut.
Figure 4:
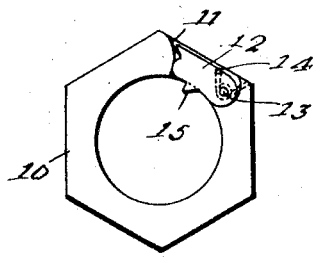
Fig. 4 is an outer face view of the locking member.

In the drawings a bolt is indicated by the numeral 1 and is of the ordinary construction, but has its threaded shank provided at spaced intervals with longitudinally arranged grooves 2. Screwed on the bolt 1 is a nut 3 which is also of the ordinary construction, but which, in the present instance, has its outer face cut away to provide one of its edges with an outstanding shoulder 4. This shoulder or ledge 4 has its inner face centrally provided with a depression 5 that communicates with an orifice in the outer face of the nut, and the said shoulder has its inner face to one side of the said depression formed with an arcuate channeled portion 6. In the referred to orifice of the nut is inserted the offset end of a rounded spring member 8. This spring is also received in the channel 6, and finding a bearing in the inner wall of the channel relieves the offset end which is connected to the nut from undue strain. The spring 8 is arranged spirally so that the free end thereof is normally disposed a considerable distance away from the outer face of the nut and from the outer face of the shoulder 4. This outer end of the spring is provided with an angle extension in the nature of a finger 9.

The locking member is also in the nature of a nut and is indicated by the numeral 10. This member upon its outer face is provided with a pocket 11 in which is received a dog 12 that is pivoted in the said pocket as at 13. The dog is influenced by a spring 14 so that the tooth on the inner and curved surface thereof, which tooth is indicated by the numeral 15 is normally projected in the bore of the lock nut 10. The tooth 15 is designed to engage in one of the grooves 2 of the bolt 1. The inner face of the lock nut 10 is provided with equi-distantly spaced depressions 16 that are arranged circumferentially around the said inner face of the lock nut.

The nut 3 is screwed home on the bolt 1. The lock nut is then screwed upon the bolt, until the inner face thereof is brought opposite the outer face of the nut 3. The spring influenced dog 12 will then have its tooth 15 engage in one of the grooves 2 of the nut 1, and the finger 9 of the spring may be readily inserted in one of the orifices 16 of the lock nut, thus preventing the accidental unscrewing of the nut 3 on the bolt.

Having thus described the invention, what is claimed as new, is:—

1. In combination with a bolt having its shank provided with longitudinal grooves, a nut screwed on the bolt and having a spiral spring on the outer face thereof formed with an offset providing a finger, a lock nut having a spring influenced dog screwed on the bolt and the said dog engaging one of the grooves thereof, and the inner face of the said lock nut having spaced circumferentially arranged depressions, one of which being designed to receive the finger of the spring.

2. In combination, a bolt having its shank provided with longitudinal grooves, a nut screwed on said bolt, said nut having its outer ends provided at one of its edges with an outstanding shoulder the inner face of which being centrally recessed, the nut in a line with the recess having a depression therein and the said shoulder having a curved channel communicating with the depression in the inner face thereof, a rounded spirally arranged spring having both of its ends offset in opposite directions, one of said offset ends being received in the depression in the nut and one of the portions of the said spring being received in the channel of the shoulder, the opposite offset end providing an outstanding finger, a lock nut screwed on the bolt, said lock nut having a spring influenced dog pivoted thereon and designed to engage in one of the grooves of the bolt, and the inner face of the said lock nut having spaced circumferentially arranged orifices one of which designed to receive therein the finger of the spring.

In testimony whereof I affix my signature.

DEWITT T. DUCKWORTH.